(12) United States Patent
Chan et al.

(10) Patent No.: US 6,504,641 B2
(45) Date of Patent: Jan. 7, 2003

(54) DRIVER AND METHOD OF OPERATING A MICRO-ELECTROMECHANICAL SYSTEM DEVICE

(75) Inventors: Edward Chan, New Providence, NJ (US); Arman Gasparyan, New Providence, NJ (US)

(73) Assignees: Agere Systems Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 70 days.

(21) Appl. No.: 09/727,557

(22) Filed: Dec. 1, 2000

(65) Prior Publication Data

US 2002/0093722 A1 Jul. 18, 2002

(51) Int. Cl.[7] .................................................. G02F 1/03
(52) U.S. Cl. ........................................ 359/254; 359/224
(58) Field of Search ................................. 359/254, 224, 359/230, 846; 310/328

(56) References Cited

U.S. PATENT DOCUMENTS

| | | |
|---|---|---|
| 5,629,790 A | 5/1997 | Neukermans et al. |
| 5,867,297 A | 2/1999 | Kiang et al. |
| 5,903,380 A | 5/1999 | Motamedi et al. |
| 6,000,280 A | 12/1999 | Miller et al. |
| 6,201,629 B1 * | 3/2001 | McClelland et al. ........ 359/223 |

OTHER PUBLICATIONS

"Leveraged Bending for Full–Gap Positioning With Electrostatic Actuation" by Elmer S. Hung and Stephen D. Senturia; Solid–State Sensor and Actuator Workshop; Jun. 8–11, 1998; pp. 83–86.

"SMARTMOS Merges Analog and High–Voltage Power Components in Deep–Submicron CMOS;" Electronic Design; vol. 45, No. 15; Jul. 24, 2000; pp. 38–40.

"A MEMS–Based Projection Display" by Peter Van Kessel, Larry J. Hornbeck, Robert E. Meier and Michael R. Douglass; Proc. IEEE, vol. 86, No. 8, pp. 1687–1704.

* cited by examiner

Primary Examiner—Georgia Epps
Assistant Examiner—Richard Hanig

(57) ABSTRACT

A driver for use with a micro-electromechanical system (MEMS) device, method of operation thereof and a MEMS device employing the driver and method. In one embodiment, the driver includes an actuation subsystem that provides an actuation voltage to alter an angle of an optical element of the MEMS device. The driver also includes a bias subsystem, coupled to the actuation subsystem, that applies a bias voltage between the optical element and the actuation subsystem, thereby reducing the actuation voltage.

30 Claims, 7 Drawing Sheets

DRIVER AND METHOD OF OPERATING A MICRO-ELECTROMECHANICAL SYSTEM DEVICE

TECHNICAL FIELD OF THE INVENTION

The present invention is directed, in general, to micro-electromechanical system (MEMS) devices and, more specifically, to a driver and method of operating the MEMS device.

BACKGROUND OF THE INVENTION

Electrostatically actuated micro-electromechanical system (MEMS) devices have been proposed for a variety of applications. One promising use for MEMS devices is in optical switching and steering devices. In such devices, movable micro-machined mirrors are used as a switching element to direct an input optical signal to a desired output. The movement of the micro-machined mirrors is accomplished by electrostatic actuation.

In a typical MEMS device, an individual mirror is affixed to a movable support structure (i.e., a gimbal) via torsional elements such as springs. The gimbal may be coupled to a frame, also via torsional elements. Typically, two torsional elements positioned on opposing sides of the mirror, couple the mirror to the gimbal, and define an axis for mirror rotation. Similarly, two torsional elements positioned on opposing sides of the gimbal couple the gimbal to the frame, and define an axis for gimbal rotation.

In a typical situation, electrodes are positioned under the mirror and gimbal. The electrodes are configured to rotate the mirror or gimbal in either direction about its axis. The mirror or gimbal rotates under the electrostatic force between the mirror and gimbal, and is balanced in equilibrium by the restoring force of the torsional elements. The degree of rotation depends upon the amount of voltage applied to the electrodes. Traditionally, a degree of rotation up to about 9 degrees is achievable. With the above-mentioned designs, a voltage of greater than about 150 volts may be required.

Currently, there is a desire to use lower actuation voltages to rotate the mirror and gimbal structures. The lower actuation voltages open up options for conventional electronic drivers instead of using a custom high-voltage process. One of the disadvantages with the traditional switching element disclosed above is that it can not adequately operate at the lower voltages. As previously mentioned, the torsional elements are designed for a maximum actuation voltage of greater than about 150 volts and a gimbal resonant frequency of about 300 Hz.

It has been found that by reducing the stiffness of the torsional elements, the MEMS devices may be rotated using substantially reduced voltages, either in the mirror direction or the gimbal direction. However, reducing the stiffness of the torsional elements in order to reduce the voltage to about 75 volts, in accordance with the capability of the electronic drivers, is not an attractive option because the resonant frequency will drop to about 150 Hz, substantially reducing the switching speed. In addition, the torsional elements may be excessively long and weak, leading to potential failure during fabrication or significant vertical (downward) sag during operation.

Accordingly, what is needed in the art is a MEMS device, and an associated driver that overcomes the deficiencies in the prior art.

SUMMARY OF THE INVENTION

To address the above-discussed deficiencies of the prior art, the present invention provides a driver for use with a micro-electromechanical system (MEMS) device, method of operation thereof, and a MEMS device employing the driver and method. In one embodiment, the driver includes an actuation subsystem that provides an actuation voltage to alter an angle of an optical element of the MEMS device. The driver also includes a bias subsystem, coupled to the actuation subsystem, that applies a bias voltage between the optical element and the actuation subsystem, thereby reducing the actuation voltage.

Thus, in one aspect, the present invention is capable of operating at a substantially lower actuation voltage than the prior art devices. Moreover, the lower voltage operation further allows An the MEMS device to be operated with reduced power consumption and increased reliability. Likewise, the present invention may accomplish the substantially lower actuation voltage without a substantial reduction in rotation angles and rotation speed.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The invention is best understood from the following detailed description when read with the accompanying FIGUREs. It is emphasized that in accordance with the standard practice in the optoelectronic industry, various features may not be drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
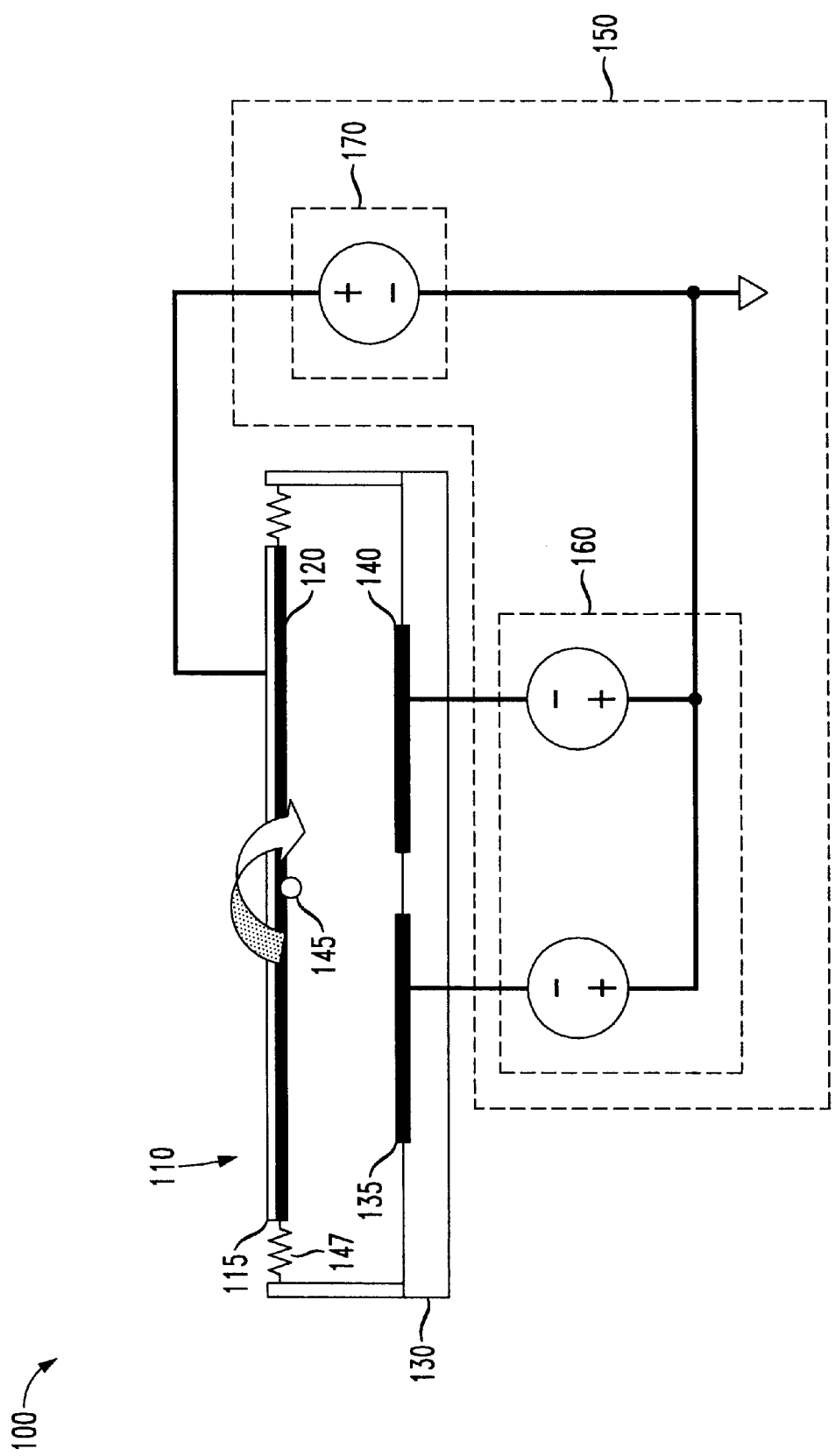
FIG. 1 illustrates a cross-sectional view of one embodiment of a micro-electromechanical system (MEMS) device constructed according to the principles of the present invention.

Referring initially to FIG. 1, illustrated is a cross-sectional view of one embodiment of a micro-electromechanical system (MEMS) device 100, constructed according to the principles of the present invention. The MEMS device 100 includes an optical element 110, such as a mirror, and a light reflective optical layer 115 formed over a substrate 120. The MEMS device 100 further includes a mounting substrate 130 on which the optical element 110 is rotatably mounted. As illustrated in FIG. 1, the mounting substrate 130 includes a plurality of electrodes 135, 140 (first and second electrodes) spaced adjacent thereto. In a typical situation, the first and second electrodes 135, 140, are in electrical communication with a surface of the optical element 110. In an alternative embodiment, however, the first and second electrodes 135, 140, may be in electrical communication with an object coupled to the optical element 110.

The MEMS device 100 further includes a driver 150 couplable to the optical element 110. The driver 150 includes an actuation subsystem 160 and a bias subsystem 170. The actuation subsystem 160 provides an actuation voltage to alter an angle of the optical element 110. For example, if a negative actuation voltage were applied to the first electrode 135 while maintaining the second electrode 140 to ground, the optical element 110 would tilt to the left. As one skilled in the art knows, applying the negative actuation voltage to the second electrode 140 while maintaining the first electrode 135 to ground, would have the opposite effect. It should also be noted that one of the first and second electrodes 135, 140, need not be maintained to ground, as long as there is a voltage differential there between. As illustrated in FIG. 1, the optical device includes a fulcrum 145, wherein the optical element 110 would tilt about the fulcrum 145.

The bias subsystem 170 is coupled to the actuation subsystem 160 and applies a bias voltage, such as a common-mode DC bias voltage, between the optical element 110 and the actuation subsystem 160. It has been found that by applying the bias voltage between the optical element 110 and the actuation subsystem 160, the actuation voltage used to rotate the optical element 110 a given number of degrees, may be substantially reduced. In an exemplary embodiment of the present invention, the bias voltage creates an electrostatic spring softening of springs 147 supporting the optical element 110, thus decreasing the actuation. voltage by more than about 75%. While the bias voltage may vary, it should be less than about 130% of a critical voltage of the MEMS device 100 (i.e., maximum voltage that may be applied to the first or second electrodes 135, 140, before the optical device 110 snaps down.) The bias voltage may be applied using any stable DC power supply.

Figure 2:
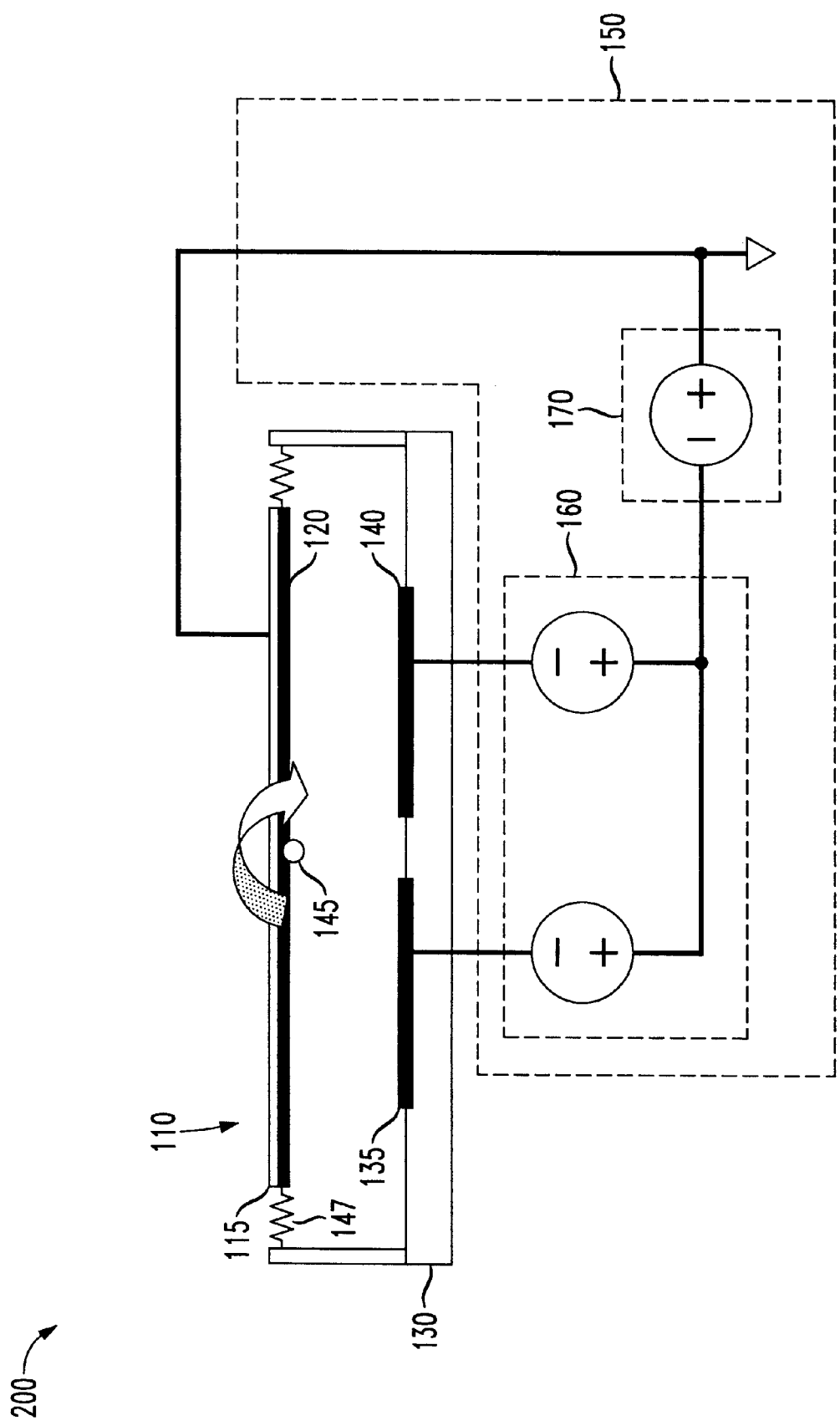
FIG. 2 illustrates a cross-sectional view of another embodiment of the MEMS device of FIG. 1.

In the embodiment shown in FIG. 1, the bias voltage is being applied to the surface of the optical element 110, in terms of a positive potential. Alternatively, the bias subsystem 170 may be oriented to apply a negative potential bias voltage to the actuation system 160 in accordance with the MEMS device 200 illustrated in FIG. 2. The net effect of the two embodiments of FIGS. 1 and 2 is the same, wherein a reduction in the differential voltage swing to tilt the optical element 110 is achieved.

Figure 3:
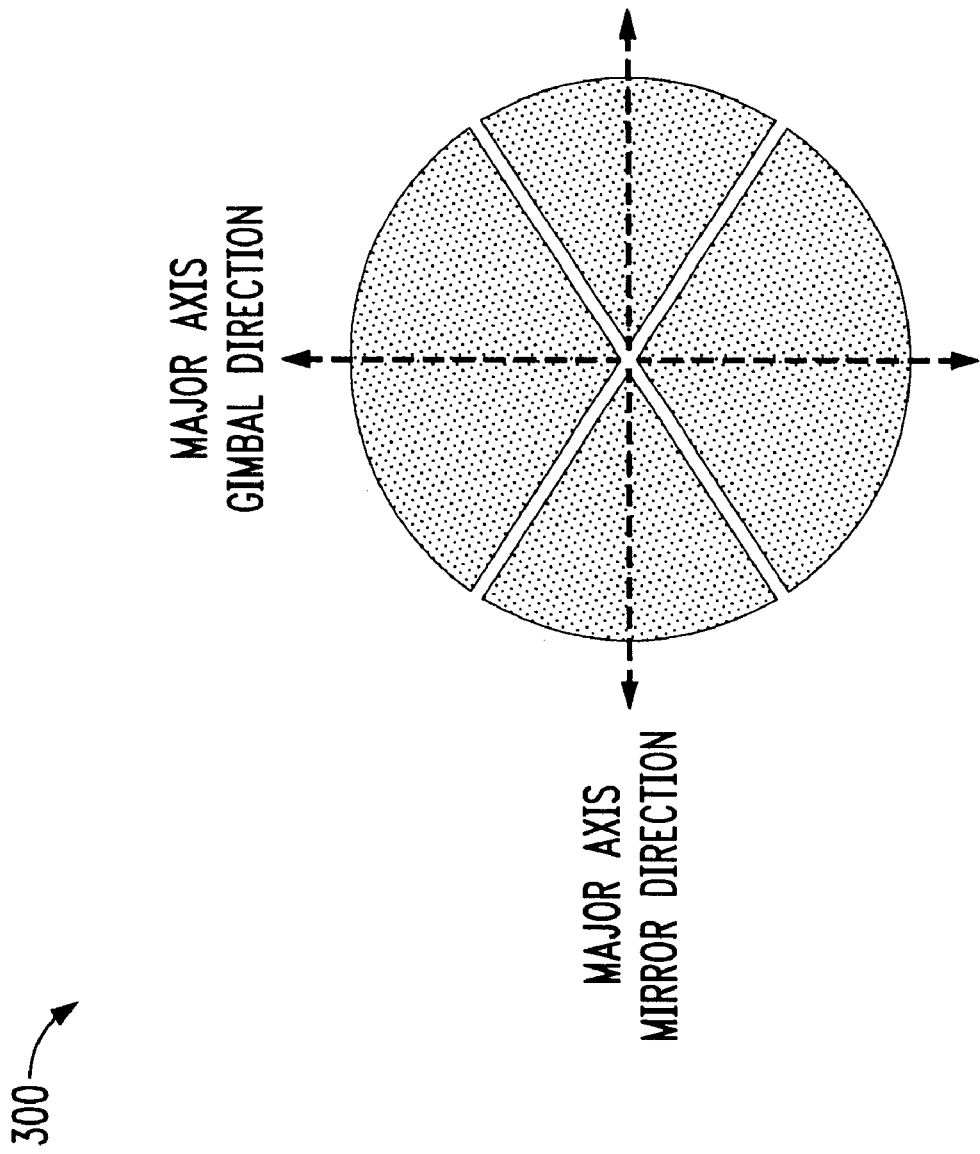
FIG. 3 illustrates a top down view of an embodiment of a four-quadrant electrode that could be used to tilt a MEMS device in both a mirror and gimbal direction, in accordance with the principles of the present invention.

One skilled in the art understands that, thus far, the concept has been described for tilting along one axis (e.g., the mirror axis.) However, one skilled in the art further understands that the concept also applies to two-axis tilting, mainly in both the mirror and gimbal directions. For instance, an electrode design could be used to tilt a MEMS device in both a mirror and gimbal direction, in accordance with the four quadrant electrode 300 illustrated in FIG. 3. The angles subtended by the gimbal electrodes may be larger than those by the mirror electrodes. This tends to make up for the increased rotational inertia that exists in the gimbal direction. Even though quadrant electrodes have been illustrated and described, other electrode designs, such as mirror-and-gimbal designs, are within the broad scope of the present invention.

Figure 4:
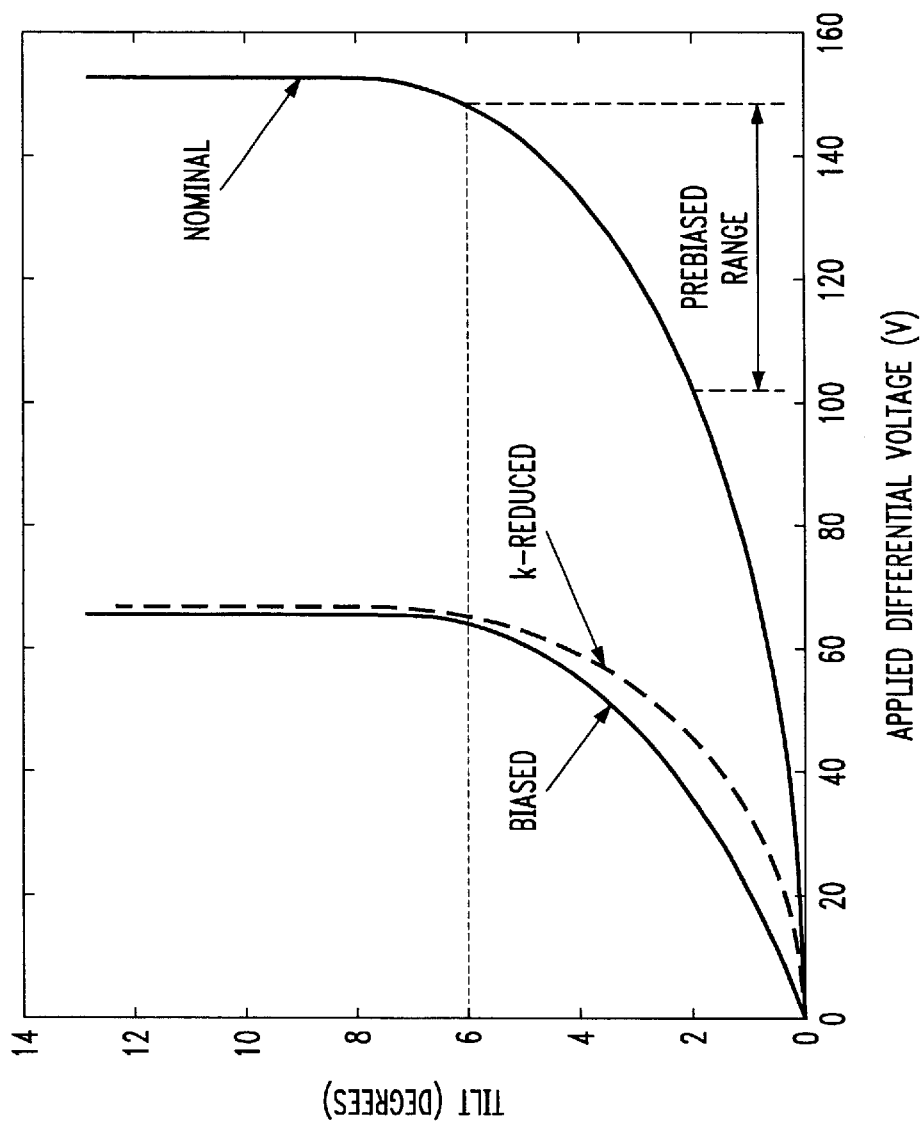
FIG. 4 illustrates a graphical representation demonstrating selected advantages which may be achieved by applying a bias voltage between an optical element and an actuation subsystem, in accordance with the principles of the present invention.

Turning now to FIG. 4, with continuing reference to FIG. 1, illustrated is a graphical representation 400 demonstrating selected advantages which may be achieved by applying the bias voltage between the optical element 110 and the actuation subsystem 160, in accordance with the principles of the present invention. The graphical representation 400 illustrates mirror tilt angle versus actuation voltage applied (e.g., applied differential voltage) to the first and second electrodes 135, 140, for three different situations. The three different situations illustrated, include a traditional design (nominal), a reduced torsional stiffness design (k-reduced), and the bias voltage design (biased). For the bias voltage design illustrated in FIG. 4, a bias voltage of about 75 volts is being applied. It should be noted that the value of the bias voltage may be higher or lower depending on the desired actuation voltage and the desired amount of tilt of the optical element 110.

As can be noticed by the graphical representation 400, for a given degree of tilt, which in this example will be chosen to be about 6 degrees, the actuation voltage may range from about 150 volts for the traditional design, to about 65 volts for both the reduced torsional stiffness design and the bias voltage design. Thus, a substantial decrease in the applied actuation voltage is realized by both the reduced torsional stiffness design and the bias voltage design. It should be noted that the k-reduced design also experiences reduced resonant frequency, substantially reducing the switching speed.

Figure 5:
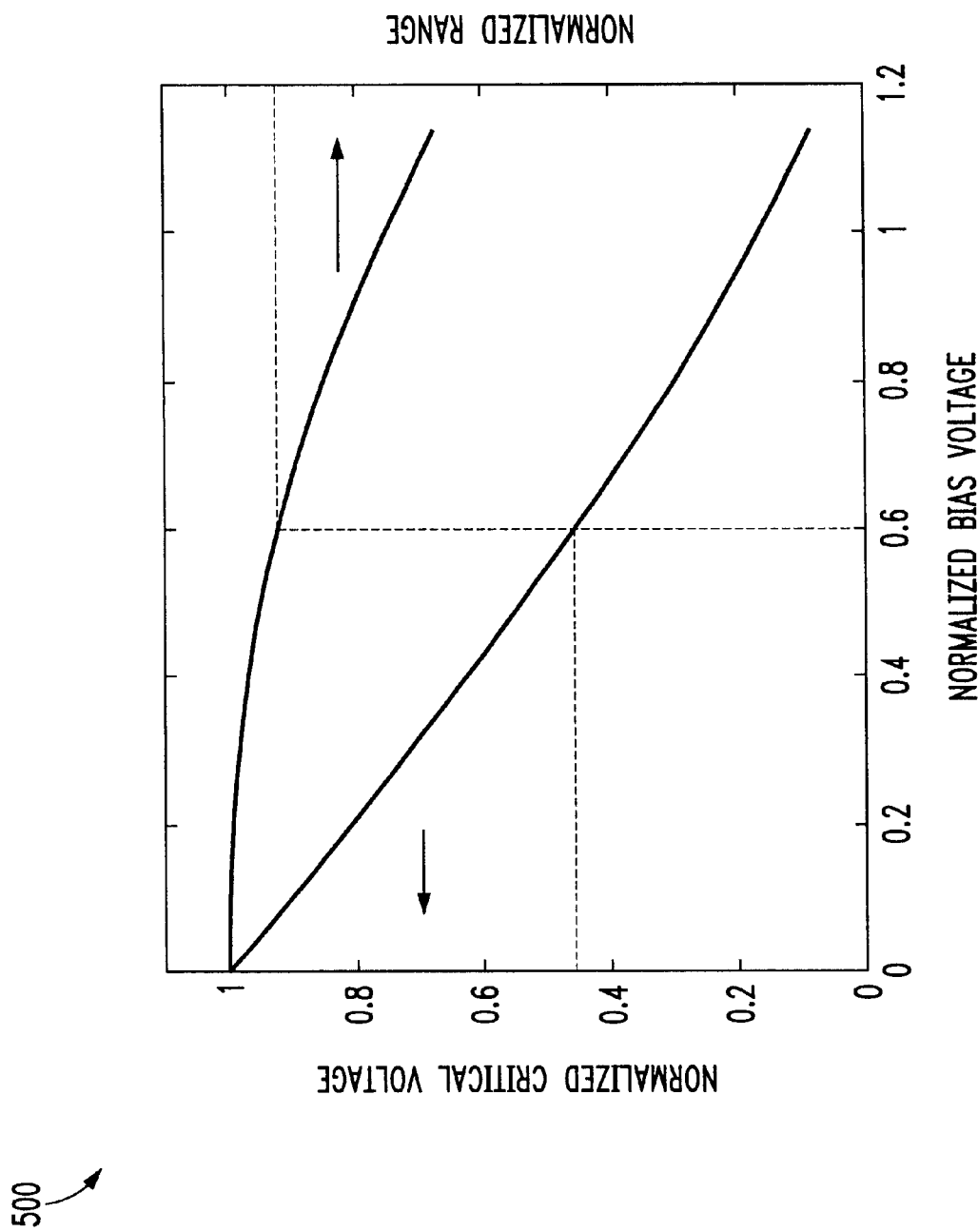
FIG. 5 illustrates a graphical representation of an actuation voltage (critical voltage) and maximum stable range, as a function of an applied bias voltage, in accordance with the principles of the present invention.

Turning now to FIG. 5, with continuing reference to FIG. 1, illustrated is a graphical representation 500 of an actuation voltage (critical voltage) and maximum stable range as a function of an applied bias voltage, in accordance with the principles of the present invention. In certain situations, because of positive feedback, the amount of tilt that would generally be available using the higher actuation voltage may undesirably be reduced when using the bias voltage design. In the example shown in FIG. 5, the bias voltage has been normalized to an original actuation voltage of the MEMS device 100. The term "original actuation voltage," as used herein, refers to the actuation voltage used to tilt the optical element 110 a predetermined number of degrees without using the bias subsystem 170. From the graphical representation 500 illustrated in FIG. 5, one skilled in the art can see that, for example, applying a bias voltage of about 60% of the original actuation voltage of the device, decreases the actuation voltage to about 45% of the original actuation voltage. As an example, if the original actuation voltage was typically 150 volts, a bias voltage of about 90 volts could be applied between the optical element 110 and the actuation subsystem 160, subsequently reducing the actuation voltage to about 65 volts.

From the graphical representation 500 illustrated in FIG. 5, one skilled in the art can also see that, for example, applying a bias voltage of about 60% of the original actuation voltage of the device, reduces the normalized tiltable range to about 90% of the tiltable range generally achievable at the higher original actuation voltage. Thus, for the example where the original actuation voltage is about 150 volts and the original tiltable range is about 10 degrees, using the applied bias voltage of about 90 volts may reduce the actuation voltage to about 65 volts, however, it may also reduce the achievable tiltable range to about 9 degrees.

The loss in tiltable range may be compensated for by using two distinct methods. The loss in tiltable range may be compensated for by either increasing the total gap between the first and second electrodes 135, 140, and the optical element 110, or by reducing the size of the first and second electrodes 135, 140. As can be seen by the equation $$V_{ACT} \propto \omega \sqrt{\frac{g^3}{R^4}},$$

where $V_{ACT}$ is the actuation voltage, $\omega$ is the resonant frequency, g is the gap between the first and second electrodes 135, 140, and the optical element 110, and R is the radius of the first and second electrodes 135, 140, increasing the gap increases the actuation voltage. However, for the same tiltable range (same maximum tilt angle), the actuation voltage may still be reduced with increased bias voltage, resulting in the same tiltable range.

Figure 6:
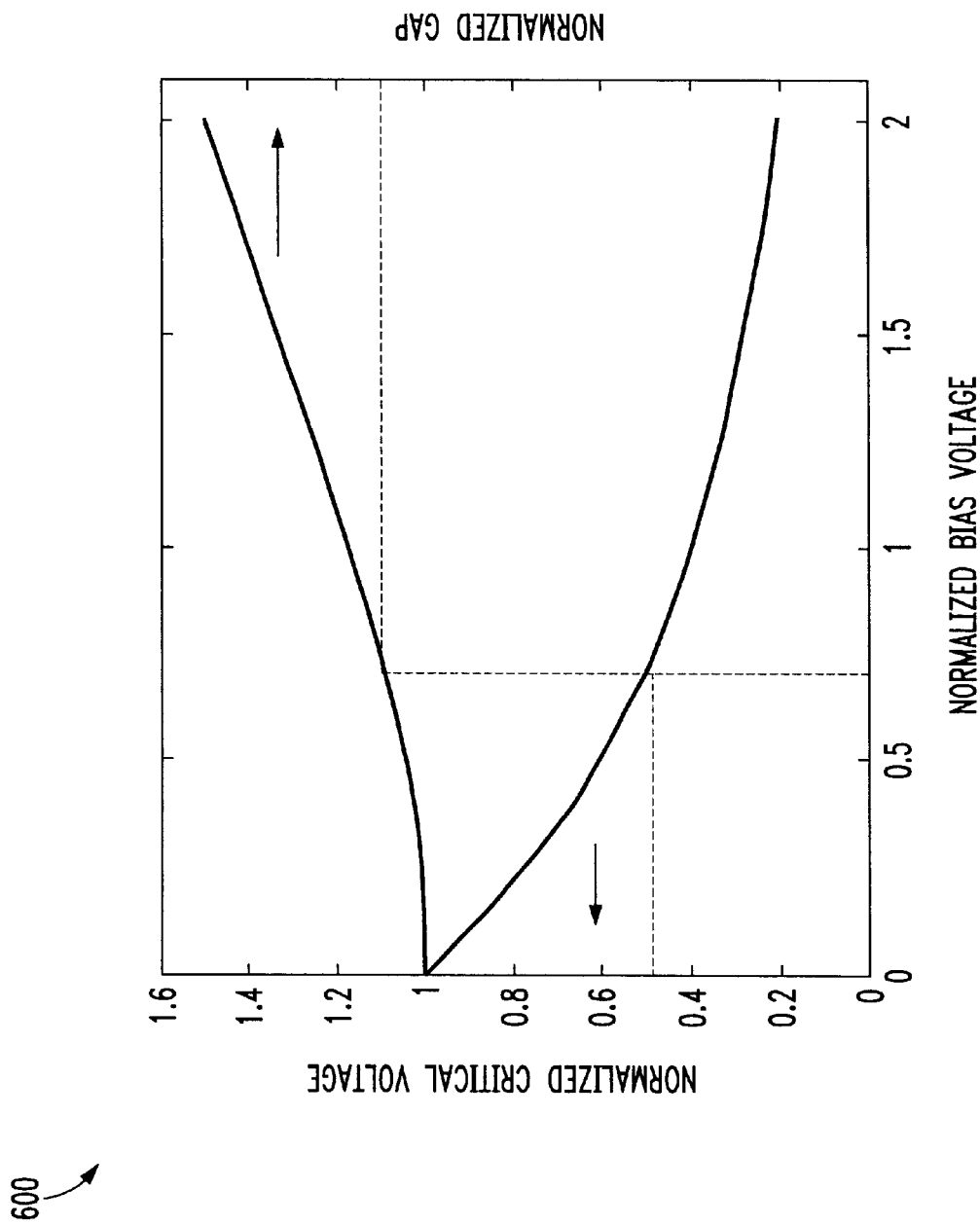
FIG. 6 illustrates a graphical representation demonstrating that a gap spacing may be increased to maintain an acceptable tilting range, in accordance with the principles of the present invention.
Figure 7:
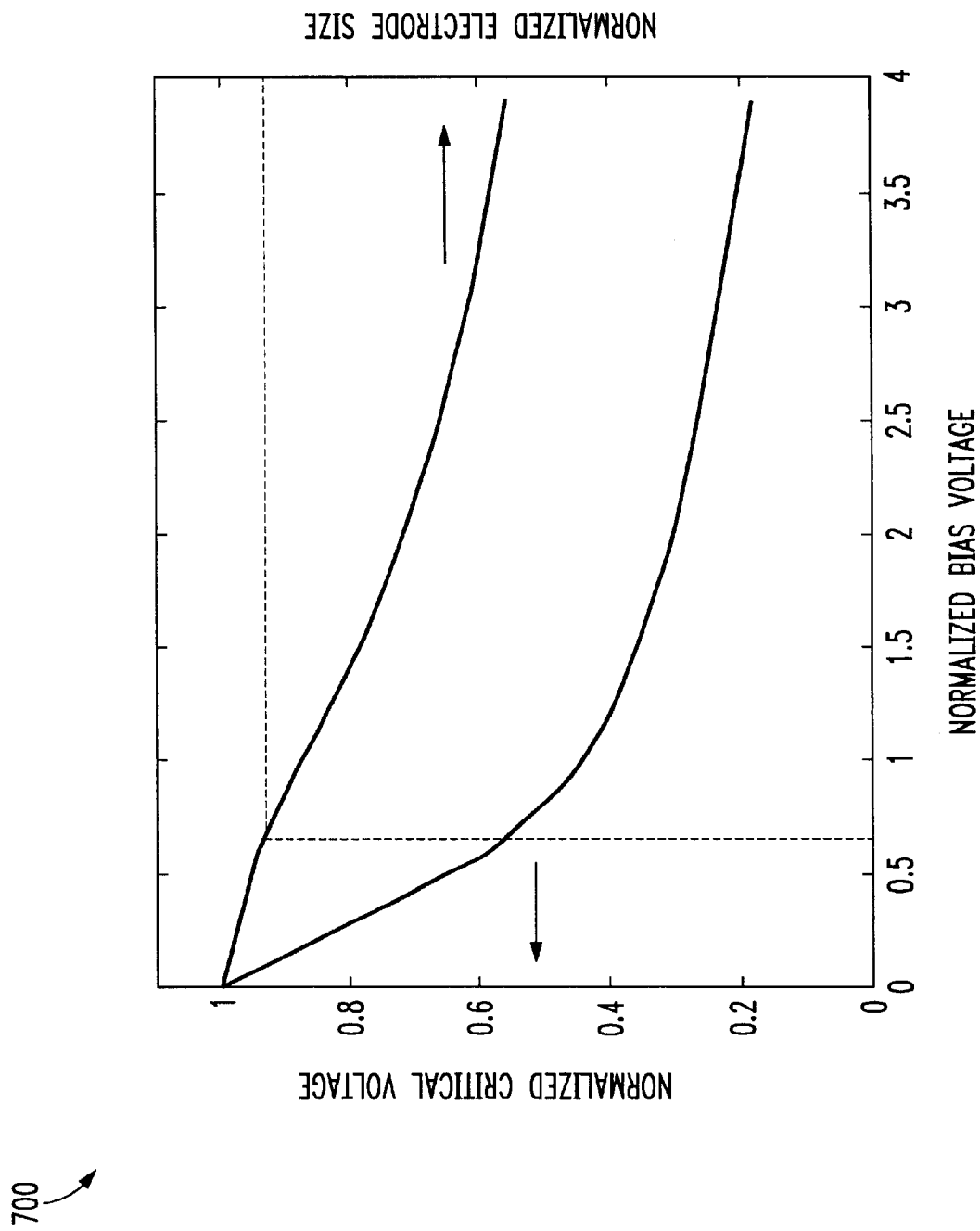
FIG. 7 illustrates a graphical representation demonstrating that the electrode size may be decreased to maintain an acceptable tiltable range, in accordance with the principles of the present invention.

Turning now to FIG. 6, illustrated is a graphical representation 600 of a normalized actuation voltage and gap spacing as a function of applied bias voltage, in accordance with the principles of the present invention. As can be understood by graphical representation 600, and given the example discussed above with the bias voltage of 90 volts, to maintain the same tiltable angle, the gap may be increased by about 110%. In contrast, if one chooses to reduce the size of the electrodes to maintain the same tiltable range, the voltage penalty is more harsh, as indicated by the equation discussed above. Thus, it should be understood that the reduction in actuation voltage is slightly less for a similar bias voltage, as illustrated in the graphical representation 700, whereby a size of the first and second electrodes 135, 140, may be decreased to maintain the same tiltable range. Once again using the example above, to maintain the same tiltable range using a 90 volt bias voltage, the size of the electrodes should be decreased by about 5%.

The above discussed invention opens up other options for electronic drivers, rather than custom high-voltage processes with limited integration possibilities. For example, some level of digital logic may be integrated into electronic processes for actuation voltages under 100 volts, however, even more levels may be integrated at voltages below 65 volts. This provides potential for compact, integrated, cheaper, and more reliable electronic devices. Reduced power consumption, and hence power dissipation requirements, may also be achieved using a bias subsystem in accordance with the principles of the present invention. Moreover, because of the reduced actuation voltage, the long term reliability of the micro mechanical components against anodic oxidation, and connectors against dielectric breakdown, may be achieved. Also very important is the increase in switching speed achievable in a MEMS device at a given actuation voltage by including a bias subsystem. Likewise, all of the above benefits are substantially achieved without much impact on the resonant frequency and tiltable range, as experienced in the prior art devices.

Although the present invention has been described in detail, those skilled in the art should understand that they can make various changes, substitutions and alterations herein without departing from the spirit and scope of the invention in its broadest form.

What is claimed is:

1. A driver for use with a micro-electromechanical system (MEMS) device, comprising:
    an actuation subsystem configured to provide an actuation voltage to alter an angle of an optical element of said MEMS device; and
    a bias subsystem coupled to said actuation subsystem and configured to apply a bias voltage between said optical element and said actuation subsystem thereby reducing said actuation voltage.

2. The driver as recited in claim 1 wherein said bias voltage is a common-mode DC bias voltage.

3. The driver as recited in claim 1 wherein said bias voltage reduces said actuation voltage by more than about 75%.

4. The driver as recited in claim 1 wherein said actuation subsystem comprises a plurality of electrodes in electrical communication with a surface of said optical element.

5. The driver as recited in claim 1 wherein said actuation subsystem comprises a plurality of electrodes in electrical communication with an object coupled to said optical element.

6. The driver as recited in claim 1 wherein said MEMS device comprises a fulcrum and said actuation subsystem is configured to apply said actuation voltage to cause said optical element to rotate about said fulcrum.

7. The driver as recited in claim 1 wherein said MEMS device includes a spring and said bias voltage causes an electrostatic spring softening of said spring, thereby reducing said actuation voltage.

8. The driver as recited in claim 1 wherein said bias voltage is less than about 130% of a critical voltage of said MEMS device.

9. A method of operating a micro-electromechanical system (MEMS) device, comprising:
    providing an actuation voltage to alter an angle of an optical element of said MEMS device; and
    applying a bias voltage between said optical element and said actuation subsystem thereby reducing said actuation voltage.

10. The method as recited in claim 9 wherein said applying said bias voltage comprises applying a common-mode DC bias voltage.

11. The method as recited in claim 9 wherein said applying said bias voltage reduces said actuation voltage by more than about 75%.

12. The method as recited in claim 9 wherein said providing said actuation voltage comprises providing said actuation voltage to a plurality of electrodes in electrical communication with a surface of said optical element.

13. The method as recited in claim 9 wherein said providing said actuation voltage comprises providing said actuation voltage to a plurality of electrodes in electrical communication with an object coupled to said optical element.

14. The method as recited in claim 9 wherein said providing said actuation voltage causes said optical element to rotate about a fulcrum of said MEMS device.

15. The method as recited in claim 9 wherein said MEMS device includes a spring and said bias voltage causes an electrostatic spring softening of said spring, thereby reducing said actuation voltage.

16. The method as recited in claim 9 wherein said bias voltage is less than about 130% of a critical voltage of said MEMS device.

17. The method as recited in claim 9 wherein said applying said bias voltage comprises applying a positive potential bias a voltage to a surface of said optical element.

18. The method as recited in claim 9 wherein said applying said bias voltage comprises applying a negative potential bias voltage to an actuation system.

19. The method as recited in claim 9 further comprising increasing a gap spacing between said optical element and an electrode to compensate for a decrease in tiltable range.

20. The method as recited in claim 19 further comprising decreasing a size of said electrode to compensate for said decrease in said tiltable range.

21. A micro-electromechanical system (MEMS) device, comprising:
- an optical element having a light reflective optical layer located over a substrate;
- a mounting substrate on which said optical element is rotatably mounted, said mounting substrate having a plurality of electrodes spaced adjacent thereto; and
- a driver, couplable to said optical element, including:
  - an actuation subsystem that provides an actuation voltage to alter an angle of said optical element, and
  - a bias subsystem, coupled to said actuation subsystem, that applies a bias voltage between a surface of said optical element and said actuation subsystem thereby reducing said actuation voltage.

22. The MEMS device as recited in claim 21 wherein said bias voltage is a common-mode DC bias voltage.

23. The MEMS device as recited in claim 21 wherein said bias voltage reduces said actuation voltage by more than about 75%.

24. The MEMS device as recited in claim 21 wherein said plurality of electrodes are in electrical communication with a surface of said optical element.

25. The MEMS device as recited in claim 21 wherein said plurality of electrodes are in electrical communication with an object coupled to said optical element.

26. The MEMS device as recited in claim 21 wherein said plurality of electrodes comprise a four quadrant electrode structure.

27. The MEMS device as recited in claim 21 wherein said plurality of electrodes comprise a mirror-and-gimbal electrode structure.

28. The MEMS device as recited in claim 21 wherein said mounting substrate comprises a fulcrum and said actuation subsystem applies said actuation voltage to cause said optical element to rotate about said fulcrum.

29. The MEMS device as recited in claim 21 wherein said MEMS device includes a spring and said bias voltage causes an electrostatic spring softening Of said spring, thereby reducing said actuation voltage.

30. The MEMS device as recited in claim 21 wherein a spacing between said plurality of electrodes and said mounting substrate may be increased or decreased to provide more or less rotation.

* * * * *